United States Patent
Kim (10) Patent No.: US 10,960,725 B2
(45) Date of Patent: Mar. 30, 2021

(54) ACTIVE ROLL CONTROL APPARATUS

(71) Applicant: MANDO CORPORATION, Gyeonggi-do (KR)

(72) Inventor: Chang Jun Kim, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 340 days.

(21) Appl. No.: 15/902,982

(22) Filed: Feb. 22, 2018

(65) Prior Publication Data

US 2018/0244126 A1 Aug. 30, 2018

(30) Foreign Application Priority Data

Feb. 24, 2017 (KR) .................. 10-2017-0024559

(51) Int. Cl.
*B60G 21/055* (2006.01)
*B60G 17/016* (2006.01)

(52) U.S. Cl.
CPC ..... *B60G 21/0558* (2013.01); *B60G 17/0162* (2013.01); *B60G 2202/135* (2013.01); *B60G 2202/42* (2013.01); *B60G 2204/1224* (2013.01); *B60G 2204/4193* (2013.01); *B60G 2206/427* (2013.01); *B60G 2800/012* (2013.01)

(58) Field of Classification Search
CPC .............. B60G 21/055; B60G 21/0553; B60G 21/0555; B60G 21/0558; B60G 17/16; B60G 17/161; B60G 17/164; B60G 17/016; B60G 17/0161; B60G 17/0164
See application file for complete search history.

(56) References Cited

U.S. PATENT DOCUMENTS

| | | | |
|---|---|---|---|
| 8,746,705 B1* | 6/2014 | Kim .................. | B60G 7/001 280/124.149 |
| 10,336,153 B2* | 7/2019 | Seong ................. | B60G 17/021 |
| 2006/0113734 A1* | 6/2006 | Won .................... | B60G 3/06 280/5.511 |
| 2006/0149444 A1* | 7/2006 | Schindler ........... | B60G 17/0161 701/37 |
| 2007/0114732 A1* | 5/2007 | Dellacha ............. | B60G 21/103 280/5.52 |
| 2008/0300752 A1* | 12/2008 | Poilbout ............. | B60G 17/0161 701/37 |
| 2009/0062984 A1* | 3/2009 | Poilbout ............. | B60G 17/0161 701/37 |
| 2010/0013175 A1* | 1/2010 | Maeda ................ | B60G 11/183 280/5.511 |

(Continued)

*Primary Examiner* — Barry Gooden, Jr.
(74) *Attorney, Agent, or Firm* — Ladas & Parry, LLP (57) ABSTRACT

Provided is an active roll control apparatus for controlling a stiffness value of a stabilizer bar by moving the stabilizer bar, which is installed between left and right wheels of a vehicle and extends in a first direction, and a stabilizer link connected with the stabilizer bar to improve turning stability of the vehicle by actively controlling roll stiffness of the vehicle. The active roll control apparatus includes rotating shafts having one ends connected to both ends of the stabilizer bar, moving units into which the rotating shafts are inserted and which are movable along outer side surfaces of the rotating shafts in a second direction perpendicular to the first direction, and a driving unit configured to rotate the rotating shafts to move the moving units.

12 Claims, 4 Drawing Sheets

(56) References Cited

U.S. PATENT DOCUMENTS

| | | | |
|---|---|---|---|
| 2012/0049480 A1* | 3/2012 | Lee | B60G 17/025 280/124.106 |
| 2013/0154210 A1* | 6/2013 | Teijeiro Castro | B60G 17/0162 280/6.157 |
| 2013/0226405 A1* | 8/2013 | Koumura | B60G 17/08 701/38 |
| 2015/0057885 A1* | 2/2015 | Brady | B60G 17/06 701/38 |
| 2016/0185180 A1* | 6/2016 | Schmitt | B60G 17/025 280/124.165 |
| 2017/0305227 A1* | 10/2017 | Seong | B60G 17/021 |

* cited by examiner

ACTIVE ROLL CONTROL APPARATUS

CROSS-REFERENCE TO RELATED APPLICATION

This application claims priority to and the benefit of Korean Patent Application No. 2017-0024559, filed on Feb. 24, 2017, the disclosure of which is incorporated herein by reference in its entirety.

BACKGROUND

1. Field of the Invention

The present invention relates to an active roll control apparatus, and more particularly, to an active roll control apparatus which allows turning stability of a vehicle to be improved by actively controlling roll stiffness of the vehicle.

2. Discussion of Related Art

Generally, a suspension system of a vehicle is a system for preventing damage to a vehicle body and freight and improving ride quality by connecting the wheel axles and the vehicle body and controlling vibration or impact transmitted from a road to wheel axles not to be directly transmitted to the vehicle body when the vehicle is driving.

The suspension system includes a chassis spring for absorbing an impact from a road, a shock absorber for improving ride quality by attenuating free vibration of the chassis spring, and a stabilizer bar for suppressing roll of a vehicle.

Among them, the stabilizer bar has both sides of a straight part fixed to the vehicle body, and both ends fixed to a lower arm or a strut bar by a stabilizer link. Therefore, the stabilizer bar does not work when both left and right wheels are simultaneously moved upward and downward, but performs an anti-roll function that suppresses roll of the vehicle body using torsional elastic force generated while being distorted when the left and right wheels move upward and downward relatively to each other.

That is, when an outer side of a turn of the vehicle body is inclined by centrifugal force during turning of the vehicle, or when left and right wheels relatively have a phase difference by a bump or rebound when the vehicle is driving, the stabilizer bar stabilizes a position of the vehicle using the torsional elastic force.

However, the stabilizer bar is not sufficient to secure turning stability under various conditions when using only the torsional elastic force thereof due to a constant stiffness value, and thus an active roll control unit that enables an active roll control by an actuator, connected to a front end of the stabilizer bar and including a hydraulic cylinder, a motor, or the like, has recently been developed and applied.

However, when a lever ratio of a stabilizer link is controlled, since conventional active roll control apparatuses should perform a control in a forward direction in which the lever ratio is increased or in a backward direction in which the lever ratio is decreased, the capacity of an actuator should be high, and thus the capacity of a motor should be high.

In this case, the high capacity of the motor refers to the large size of the motor, and thus costs are increased, it is hard to mount the motor, and it is hard to achieve stability of the vehicle.

SUMMARY OF THE INVENTION

The present invention is directed to an active roll control apparatus capable of improving turning stability of a vehicle by actively controlling roll stiffness of the vehicle by adjusting a connection position of a stabilizer link by operation of a driving unit to change a lever ratio of the stabilizer link.

Further, the present invention is directed to an active roll control apparatus capable of securing flexibility of an installation space without limitations on an installation space of the active roll control apparatus.

According to an aspect of the present invention, there is provided an active roll control apparatus for controlling a stiffness value of a stabilizer bar by moving the stabilizer bar, which is installed between left and right wheels of a vehicle and extends in a first direction, and a stabilizer link connected with the stabilizer bar, the active roll control apparatus including rotating shafts having one ends connected to both ends of the stabilizer bar, moving units into which the rotating shafts are inserted and which are movable along outer side surfaces of the rotating shafts in a second direction perpendicular to the first direction, and a driving unit configured to rotate the rotating shafts to move the moving units.

The rotating shaft may be formed as a lead screw, and the moving unit may be formed as a nut engaged with the lead screw.

The driving unit may include a worm wheel connected with the other end of the rotating shaft to rotate the rotating shaft and a worm shaft engaged with the worm wheel to rotate the worm wheel.

The driving unit may further include a motor and a driving shaft connected between the worm shaft and a rotating shaft of the motor.

The driving shaft may transmit a rotating force of the motor to the worm shaft and may be a flexible shaft.

The moving units may be moved in a different direction according to a rotation direction of the motor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings so as to be easily realized by those skilled in the art. The embodiments of the present invention may be implemented in several different forms, and are not limited to the embodiments described herein. In addition, parts irrelevant to descriptions will be omitted in the drawings to clearly explain the embodiments of the present invention, and similar parts are denoted by the same or similar reference numerals throughout this specification.

It should be further understood that the terms "include," or "have" used in this specification specify the presence of stated features, numerals, steps, operations, components, parts, or a combination thereof, but do not preclude the presence or addition of one or more other features, numerals, steps, operations, components, parts, or a combination thereof.

Figure 1:
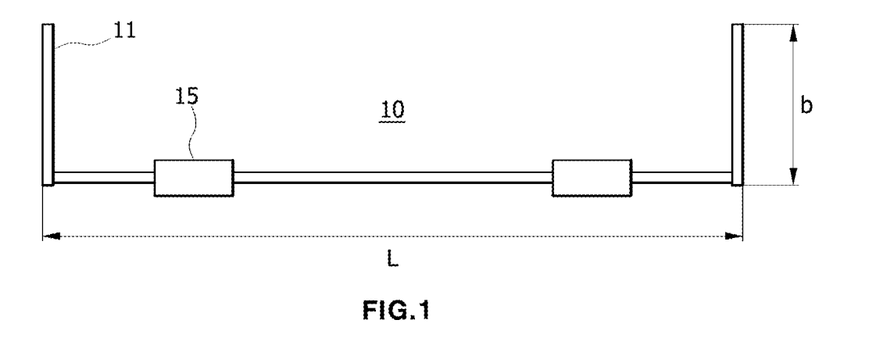
FIG. 1 is a schematic view of a stabilizer bar according to one embodiment of the present invention.

FIG. 1 is a schematic view of a stabilizer bar according to one embodiment of the present invention.

As shown in FIG. 1, a stabilizer bar 10 extends in a width direction of a vehicle body and includes lever arms 11 bent in one direction and formed at both ends thereof. Both sides of the stabilizer bar 10 are mounted on the vehicle body by mounters 15.

The active roll control apparatus including the stabilizer bar 10 actively controls roll of a vehicle by changing torsional stiffness of the stabilizer bar 10.

Meanwhile, a torsional stiffness K1 of the stabilizer bar 10 is defined by the following Equation 1.

$$K1 = K2*(L^2/b^2) \qquad \text{Equation 1}$$

In this case, K2 represents a constant, which is a value varying according to a material of the stabilizer bar 10, L represents a transverse length of the stabilizer bar 10, and b represents a length of the lever arm 11.

According to Equation 1, stiffness of the stabilizer bar 10 is proportional to the square of the transverse length of the stabilizer bar 10, and is inversely proportional to the square of the length of the lever arm 11. That is, when the transverse length of the stabilizer bar 10 is increased or the length of the lever arm 11 is decreased, the stiffness of the stabilizer bar 10 may be increased.

Meanwhile, when the stiffness of the stabilizer bar 10 is relatively high, the stabilizer bar 10 increases stability by suppressing roll when the vehicle turns, but decreases ride quality due to an impact from a road when the vehicle straightly drives.

Therefore, the stiffness of the stabilizer bar 10 may be variously applied based on whether the vehicle turns or straightly drives.

Further, the stabilizer bar 10 is mounted in a width direction of the vehicle body, and there is a limitation on increasing the transverse length of the stabilizer bar 10 to increase the stiffness of stabilizer bar 10 due to a limitation on a width of the vehicle body.

Therefore, the active roll control apparatus according to one embodiment of the present invention controls the stiffness of the stabilizer bar 10 by controlling the length of the lever arm 11. That is, the length of the lever arm 11 is decreased to increase the stiffness of stabilizer bar 10 in order to minimize an angle of roll when the vehicle turns or straight drives at a high speed, and the length of the lever arm 11 is increased to reduce the stiffness of stabilizer bar 10 in order to improve ride quality when the vehicle turns or straight drives at a low speed.

Figure 2:
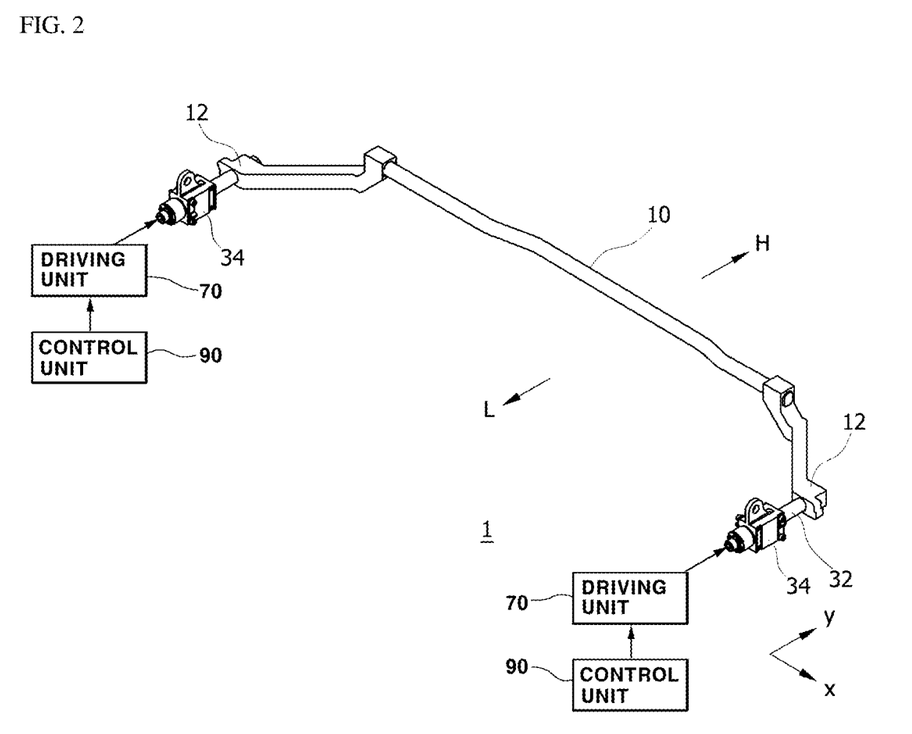
FIG. 2 is a perspective view showing an active roll control apparatus according to one embodiment of the present invention.

FIG. 2 is a perspective view showing an active roll control apparatus according to one embodiment of the present invention.

In the following description, in FIG. 2, an x-direction is defined as a first direction, and a y-direction is defined as a second direction.

As shown in FIG. 2, an active roll control apparatus 1 according to one embodiment of the present invention may include a stabilizer bar 10, a rotating shaft 32, a moving unit 34, and a driving unit 70.

The active roll control apparatus 1 according to one embodiment of the present invention varies a lever ratio of a stabilizer link (not shown) by moving the stabilizer bar 10 connected to wheels and controls a stiffness value of the stabilizer bar 10, and thus provides stability for a vehicle.

In the embodiment of the present invention, the stabilizer bar 10 may be installed to each of a front wheel and a rear wheel of the vehicle. Further, the stabilizer bar 10 extends in the first direction and may control roll of the vehicle by receiving a rotating force from the driving unit 70 when the vehicle drives.

In this case, although the first direction is not shown in the embodiment of the present invention, the first direction may be a width direction of the vehicle, and the second direction may be a direction perpendicular to the width direction of the vehicle.

Meanwhile, coupling units 12 connected with the rotating shafts 32 to be described below may be formed at both ends of the stabilizer bar 10. In this case, the coupling units 12 may include through holes (not shown) into which one ends of the rotating shafts 32 may be inserted.

In the active roll control apparatus 1 according to one embodiment of the present invention, when the stabilizer link (not shown) is moved in the second direction perpendicular to the first direction using the rotating shafts 32 and the moving units 34 based on a driving condition of the vehicle, the lever ratio of the stabilizer link (not shown) varies such that the stiffness value of the stabilizer bar 10 is controlled, and thus roll of the vehicle can be actively improved.

The pair of rotating shafts 32 may have a cylindrical shape and may be rotatably coupled to the stabilizer bar 10 by the coupling units 12 formed at both ends of the stabilizer bar 10.

Further, the rotating shafts 32 may extend in the second direction and may be disposed in a direction perpendicular to the width direction of the vehicle.

Further, the driving unit 70 moves the moving unit 34 by rotating the rotating shaft 32.

Figure 3:
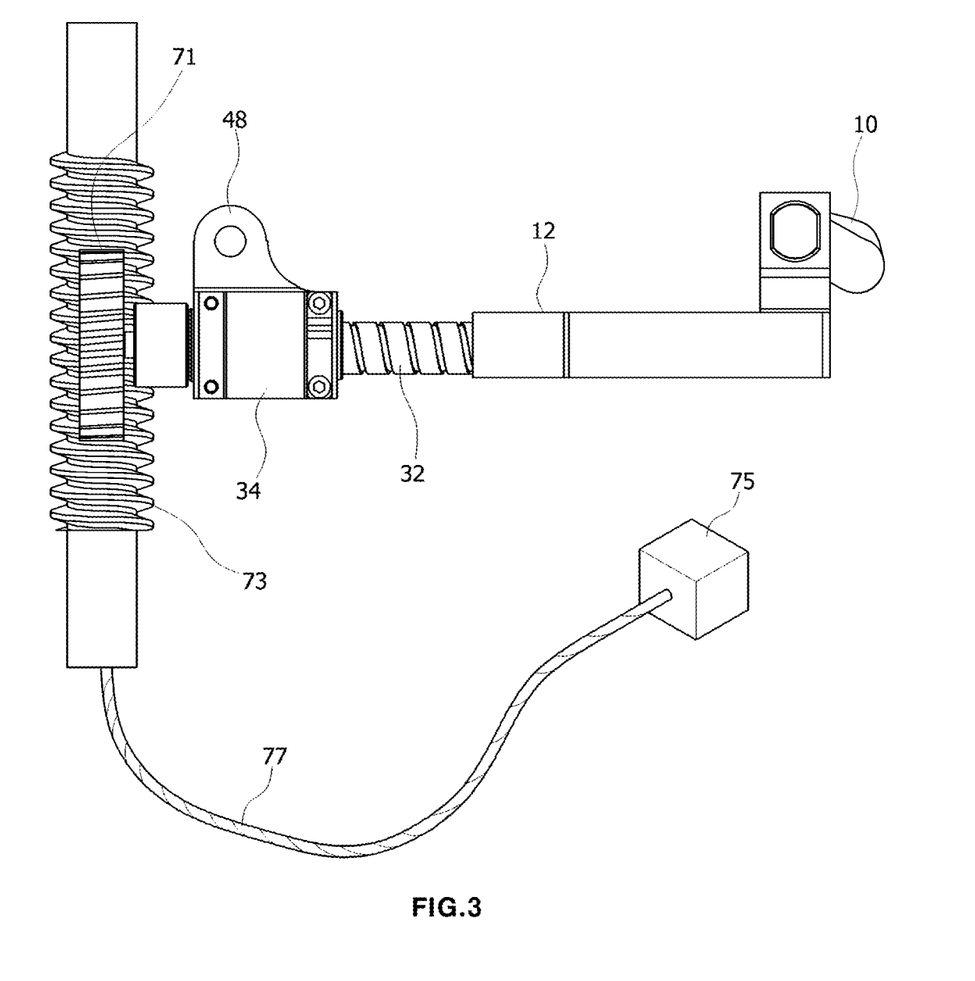
FIG. 3 is a side view showing a rotating shaft, a moving unit, a driving unit, and a stabilizer bar of the active roll control apparatus according to one embodiment of the present invention.
Figure 4:
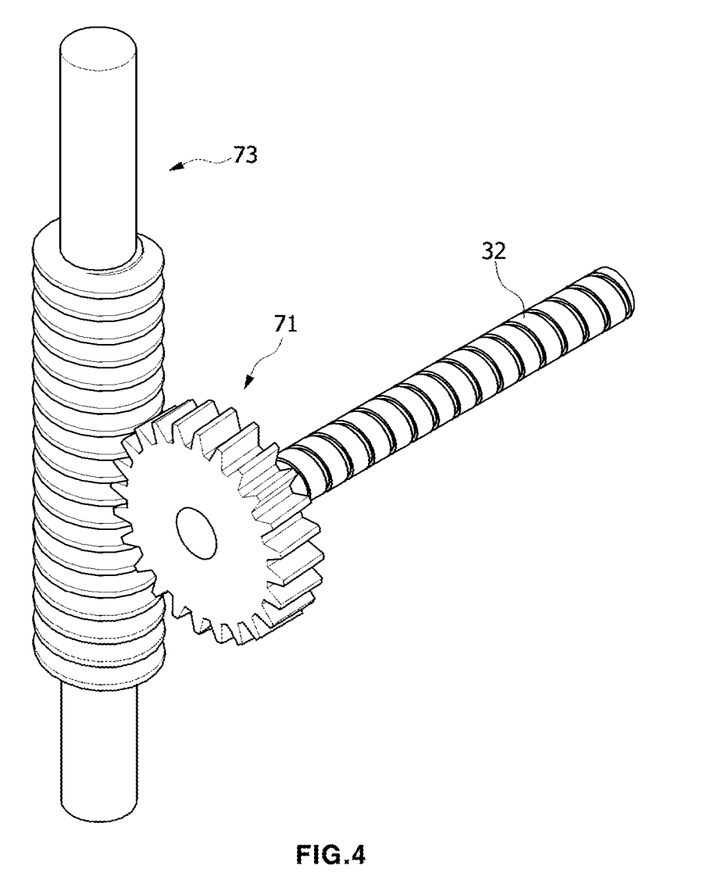
FIG. 4 is a view specifically showing a worm wheel and a worm shaft of the driving unit in FIG. 3.

FIG. 3 is a side view showing a rotating shaft, a moving unit, a driving unit, and a stabilizer bar of the active roll control apparatus according to one embodiment of the present invention. FIG. 4 is a view specifically showing a worm wheel and a worm shaft of the driving unit in FIG. 3.

As shown in FIG. 3, the rotating shaft 32 is inserted into the moving unit 34, and the moving unit 34 may be moved along an outer side surface of the rotating shaft 32. In this case, the rotating shaft 32 may be formed as a lead screw, and the moving unit 34 may be formed as a nut engaged with the lead screw.

In this case, when the rotating shaft 32 rotates, the moving unit 34 is engaged with the rotating shaft 32 and is moved along the outer side surface of the rotating shaft 32. In this case, the moving unit 34 may be moved in a different direction according to a rotation direction of the rotating shaft 32.

For example, referring to FIG. 2, when the rotating shaft 32 rotates in a forward direction in which the lever ratio is increased, the moving unit 34 is moved in an L direction. On the contrary, when the rotating shaft 32 rotates in a reverse direction in which the lever ratio is decreased, the moving unit 34 may be moved in an H direction.

In this case, when the moving unit 34 is moved along the outer side surface of the rotating shafts 32 and transmission of power is disconnected, a movement caused by external force of the moving unit 34 may be suppressed because the rotating shaft 32 is formed as the lead screw and the moving unit 34 is formed as the nut.

Meanwhile, the moving unit 34 in the embodiment of the present invention may include a connection unit 48 formed at one surface thereof to be connected with one end of the stabilizer link (not shown). The moving unit 34 is connected to the stabilizer link (not shown) by the connection unit 48, and thus the lever ratio of the stabilizer link (not shown) may be changed when the moving unit 34 moves along the outer side surface of the rotating shaft 32.

Therefore, the active roll control apparatus 1 according to one embodiment of the present invention changes a stiffness value of the stabilizer bar 10.

As shown in FIGS. 3 and 4, the driving unit 70 may include a worm wheel 71, a worm shaft 73, a motor 75, and a driving shaft 77 to move the moving unit 34 by rotating the rotating shaft 32.

In this case, the worm wheel 71 is connected to the other end of the rotating shaft 32 to rotate the rotating shaft 32, and the worm shaft 73 is engaged with the worm wheel 71 to rotate the worm wheel 71. The driving shaft 77 is connected between the worm shaft 73 and a rotating shaft of the motor 75 to transmit a rotating force of the motor 75 to the worm shaft 73.

Further, the motor 75 may be fixed to the vehicle body. In this case, the motor 75 may be a bidirectional servo motor capable of controlling the number of rotations and a direction of rotation, but is not limited thereto.

In this case, the moving unit 34 is moved in a different direction according to a rotation direction of the motor 75.

Meanwhile, a space in which the active roll control apparatus 1 may be installed is limited, small, and complex, and a method of transmitting power to the active roll control apparatus 1 may be limited.

Therefore, the driving shaft 77 is formed as a flexible shaft, and thus the active roll control apparatus 1 according to one embodiment of the present invention may secure flexibility of the installation space without a limitation on an installation space of the active roll control apparatus 1. That is, the active roll control apparatus 1 except the motor 75 is installed in a predetermined space, and the motor 75 is installed in a free space at another position using the flexible shaft, and thus the installation space can be efficiently used and a degree of freedom to select the installation space can be increased.

The driving shaft 77 may be two flexible shafts extending from a rotating shaft of one motor 75 to connect two worm shafts 73.

Therefore, two moving units 34 provided at both ends of the stabilizer bar 10 may be moved together using one motor 75 and two flexible shafts, and thus costs for two motors 75 can be saved, and an installation space can be efficiently used and a degree of freedom to select the installation space can be increased.

Further, the active roll control apparatus according to one embodiment of the present invention may further include a control unit 90 for controlling a rotation direction and rotating force of the motor 75.

In this case, the above-described one motor 75 may be disposed in the control unit 90 to increase efficiency, to reduce the number of components, and to be miniaturized.

Meanwhile, the positions of the moving units 34 provided at both ends of the stabilizer bar 10 should be the same position on the rotating shaft 32, but the positions may be changed according to a driving or operation state, which may be a factor that degrades driving stability of the vehicle. An initialization process is required to remove the factor.

Therefore, the control unit 90 may control the motor 75 to move the moving units 34 to one end of the rotating shaft 32 so as to perform initialization, and thus corrects the position of each of the moving units 34 in the same manner.

The control unit 90 may control the moving unit 34 to be moved in one direction when a speed of the vehicle is less than or equal to a first speed, and to be moved in the other direction when the speed of the vehicle is greater than or equal to a second speed.

In this case, the first speed may be a relatively low speed, the second speed may be a relatively high speed, and the stability of the vehicle may be more secured when the moving unit 34 moves in the other direction as compared to when in the one direction. For example, the control unit 90 may control the motor 75 to move the moving unit 34 in a left direction, that is, a direction toward the driving unit 70, when a speed of the vehicle is a relatively low speed, and may control the motor 75 to move the moving unit 34 in a right direction, that is, a direction toward the stabilizer bar 10, when the speed of the vehicle is a relatively high speed.

Figure 5:
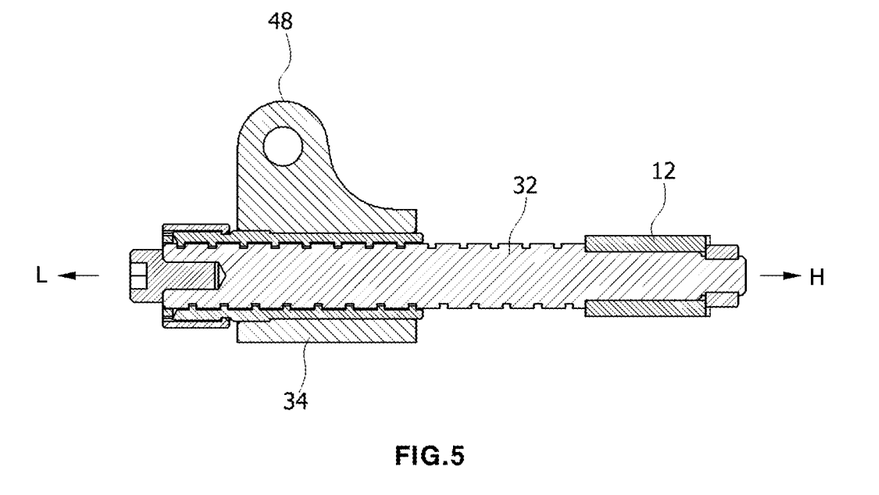
FIGS. 5 and 6 are schematic views showing an operation state of the active roll control apparatus according to one embodiment of the present invention.
Figure 6:
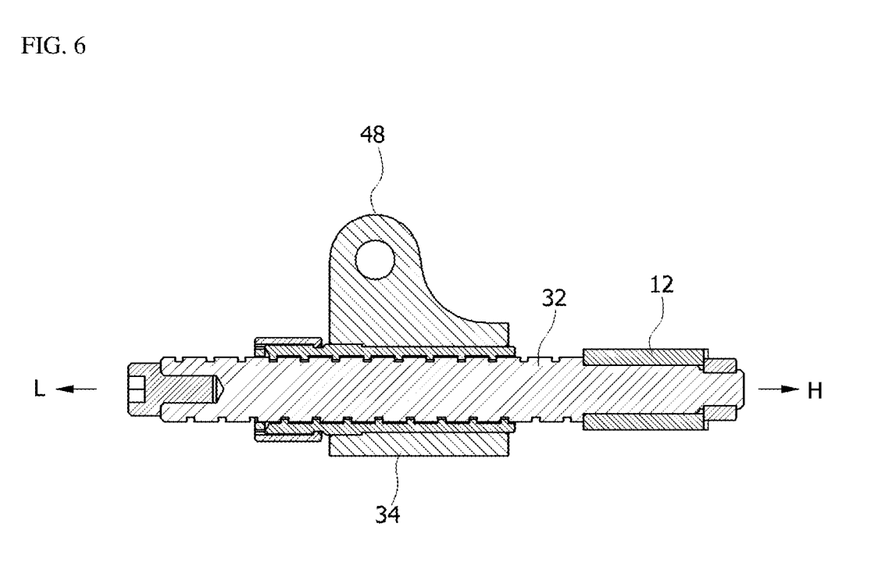

FIGS. 5 and 6 are schematic views showing an operation state of the active roll control apparatus according to one embodiment of the present invention.

First, as shown in FIG. 5, when the motor 75 rotates in a forward direction in which the lever ratio is increased, the driving shaft 77 transmits a rotating force of the motor to the worm shaft 73, and the worm wheel 71 is engaged with the worm shaft 73 and is rotated. When the rotating shaft 32 connected with the worm wheel 71 is rotated, the moving unit 34 is moved along the outer side surface of the rotating shaft 32 in the L direction.

Therefore, a length of the stabilizer link (not shown) is increased, and thus the stiffness value of the stabilizer bar 10 may be decreased.

As shown in FIG. 6, when the motor 75 rotates in a reverse direction in which the lever ratio is decreased, the driving shaft 77 transmits the rotating force of the motor to the worm shaft 73, and the worm wheel 71 is engaged with the worm shaft 73 and is rotated. When the rotating shaft 32 connected with the worm wheel 71 is rotated, the moving unit 34 is moved along the outer side surface of the rotating shaft 32 in the H direction.

Therefore, the length of stabilizer link (not shown) is decreased, and thus the stiffness value of the stabilizer bar 10 may be increased.

The active roll control apparatus 1 according to one embodiment of the present invention can prevent the capacity of the motor 75 from being increased when controlling the motor 75 in a forward direction in which the lever ratio of the stabilizer link (not shown) is increased or in a reverse direction in which the lever ratio thereof is decreased, and can save costs for the motor 75 with a relatively high capacity.

According to the present invention, an active roll control apparatus can prevent a capacity of a motor from being increased when controlling the motor in a forward direction in which a lever ratio of a stabilizer link is increased or in a reverse direction in which the lever ratio thereof is decreased, and can save costs for the motor with a relatively high capacity.

According to the present invention, an active roll control apparatus can secure flexibility of an installation space without a limitation of an installation space of the active roll control apparatus by realizing a driving shaft as a flexible shaft.

Further, according to the present invention, when a moving unit is moved along an outer side surface of a rotating shaft and transmission of power is disconnected, an active roll control apparatus can suppress a movement caused by external force of the moving unit because the rotating shaft is formed as a lead screw and the moving unit is formed as a nut.

The embodiments of the present invention have been described above. However, it should be noted that the spirit of the present invention is not limited to the embodiments in the specification and those skilled in the art and understanding the present invention may easily suggest other embodiments by addition, modification, and removal of the components within the same spirit, but those are construed as being included in the spirit of the present invention.

DESCRIPTION OF SYMBOLS

1: ACTIVE ROLL CONTROL APPARATUS
71: WORM WHEEL
10: STABILIZER BAR
73: WORM SHAFT
32: ROTATING SHAFT
34: MOVING UNIT
70: DRIVING UNIT
90: CONTROL UNIT

What is claimed is:

1. An active roll control apparatus for controlling a stiffness value of a stabilizer bar by moving the stabilizer bar, installed between wheels of a vehicle, and a stabilizer link connected with the stabilizer bar, the active roll control apparatus comprising:
   a rotatable shaft;
   a coupling unit positioned at one end of the stabilizer bar, the coupling unit coupling between the rotatable shaft and the stabilizer bar;
   a moving unit into which the rotatable shaft is inserted, the moving unit coupled to the stabilizer link and configured to be movable along the rotatable shaft in a direction perpendicular to a direction that the stabilizer bar extends;
   a driving unit configured to rotate the rotatable shaft to move the moving unit; and
   a control unit configured to control the driving unit to move the moving unit to one end of the rotatable shaft to perform initialization.

2. The active roll control apparatus of claim 1, wherein the rotatable shaft comprises a lead screw, and the moving unit comprises a nut engaged with the lead screw of the rotatable shaft.

3. The active roll control apparatus of claim 1, wherein:
   the driving unit comprises a motor having a shaft, and one or more gears operably connected with the rotatable shaft, and
   a flexible shaft extending from the shaft of the motor to one of the one or more gears.

4. The active roll control apparatus of claim 1, wherein the driving unit includes:
   a worm wheel connected with one end of the rotatable shaft to rotate the rotatable shaft; and
   a worm shaft engaged with the worm wheel to rotate the worm wheel.

5. The active roll control apparatus of claim 4, wherein the driving unit further includes:

a motor; and
a driving shaft connected between the worm shaft and a shaft of the motor.

6. The active roll control apparatus of claim 5, wherein the driving shaft is configured to transmit a rotating force of the motor to the worm shaft.

7. The active roll control apparatus of claim 5, wherein the moving unit is configured to be movable according to a rotation direction of the motor.

8. The active roll control apparatus of claim 5, wherein the control unit is configured to control a rotation direction and rotating force of the motor.

9. The active roll control apparatus of claim 5, wherein the control unit is configured to control the motor to move the moving unit in one direction when a speed of the vehicle is less than or equal to a first speed and to move the moving unit in the other direction when the speed of the vehicle is greater than or equal to a second speed.

10. An active roll control apparatus for controlling a stiffness value of a stabilizer bar by moving the stabilizer bar, which is installed between wheels of a vehicle and extends in a first direction, and a stabilizer link connected with the stabilizer bar, the active roll control apparatus comprising:
    a rotatable shaft having one end connected to one of both ends of the stabilizer bar;
    a moving unit into which the rotatable shaft is inserted, the moving unit configured to be movable along the rotatable shaft in a second direction perpendicular to the first direction; and
    a driving unit configured to rotate the rotatable shaft to move the moving unit,
    wherein the driving unit includes:
    a worm wheel connected with an other end of the rotatable shaft to rotate the rotatable shaft; and
    a worm shaft engaged with the worm wheel to rotate the worm wheel,
    wherein the driving unit further includes:
    a motor; and
    a driving shaft connected between the worm shaft and a shaft of the motor,
    wherein the driving shaft includes a flexible shaft extending from the shaft of the motor to the worm shaft.

11. The active roll control apparatus of claim 10, wherein the motor is coupled with a control unit.

12. An active roll control apparatus for controlling a stiffness value of a stabilizer bar by moving the stabilizer bar, which is installed between wheels of a vehicle and extends in a first direction, and a stabilizer link connected with the stabilizer bar, the active roll control apparatus comprising:
    a rotatable shaft having one end connected to one of both ends of the stabilizer bar;
    a moving unit into which the rotatable shaft is inserted, the moving unit configured to be movable along the rotatable shaft in a second direction perpendicular to the first direction; and
    a driving unit configured to rotate the rotatable shaft to move the moving unit,
    wherein the driving unit includes:
    a worm wheel connected with an other end of the rotatable shaft to rotate the rotatable shaft; and
    a worm shaft engaged with the worm wheel to rotate the worm wheel,
    wherein the driving unit further includes:
    a motor; and a driving shaft connected between the worm shaft and a shaft of the motor, wherein the active roll control apparatus further comprises a control unit configured to control the motor to move the moving unit to one end of the rotatable shaft to perform initialization.

\* \* \* \* \*